(12) United States Patent
Li et al.

(10) Patent No.: US 9,838,663 B2
(45) Date of Patent: Dec. 5, 2017

(54) VIRTUAL VIEWPOINT SYNTHESIS METHOD AND SYSTEM

(71) Applicant: PEKING UNIVERSITY SHENZHEN GRADUATE SCHOOL, Shenzhen (CN)

(72) Inventors: Chenxia Li, Shenzhen (CN); Ronggang Wang, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 15/009,854

(22) Filed: Jan. 29, 2016

(65) Prior Publication Data
US 2016/0150208 A1    May 26, 2016

Related U.S. Application Data

(63) Continuation-in-part of application No. PCT/CN2013/080282, filed on Jul. 29, 2013.

(51) Int. Cl.
*G06T 15/00* (2011.01)
*H04N 13/00* (2006.01)

(52) U.S. Cl.
CPC ..... *H04N 13/0011* (2013.01); *H04N 13/0018* (2013.01); *H04N 2013/0081* (2013.01)

(58) Field of Classification Search
CPC .......................... H04N 13/0011; G06T 15/205
See application file for complete search history.

(56) References Cited

U.S. PATENT DOCUMENTS

| 2011/0026809 | A1* | 2/2011 | Jeong | H04N 13/0011 382/154 |
| 2013/0321405 | A1* | 12/2013 | Chen | G06T 15/00 345/419 |
| 2014/0376635 | A1* | 12/2014 | Senoh | H04N 13/0048 375/240.16 |

OTHER PUBLICATIONS

Kwan-Jung Oh et al., Hole Filling Method Using Depth Based In-Painting for View Synthesis in Free Viewpoint Television and 3-D Video, IEEE publication, 2009, bib sheet + 4 pages of article.*
Chenxia Li et al, A Hybrid Pixel-Block Based View Synthesis for Multiviewpoint 3D Video, IEEE publication, 2013, 4 pages total.*

* cited by examiner

*Primary Examiner* — Brian P Werner
(74) *Attorney, Agent, or Firm* — Matthias Scholl, PC; Matthias Scholl

(57) ABSTRACT

A virtual viewpoint synthesis method and system, including: establishing a left viewpoint virtual view and a right viewpoint virtual view; searching for a candidate pixel in a reference view, and marking a pixel block in which the candidate pixel is not found as a hole point; ranking the found candidate pixels according to depth, and successively calculating a foreground coefficient and a background coefficient for performing weighted summation; enlarging the hole-point regions of the left viewpoint virtual view and/or the right viewpoint virtual view in the direction of the background to remove a ghost pixel; performing viewpoint synthesis on the left viewpoint virtual view and the right viewpoint virtual view; and filling the hole-points of a composite image.

5 Claims, 8 Drawing Sheets

 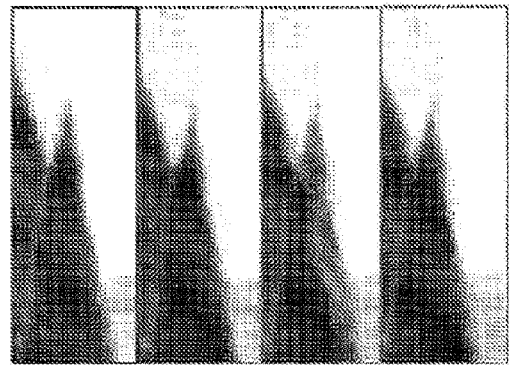
FIG. 6A        FIG. 6B
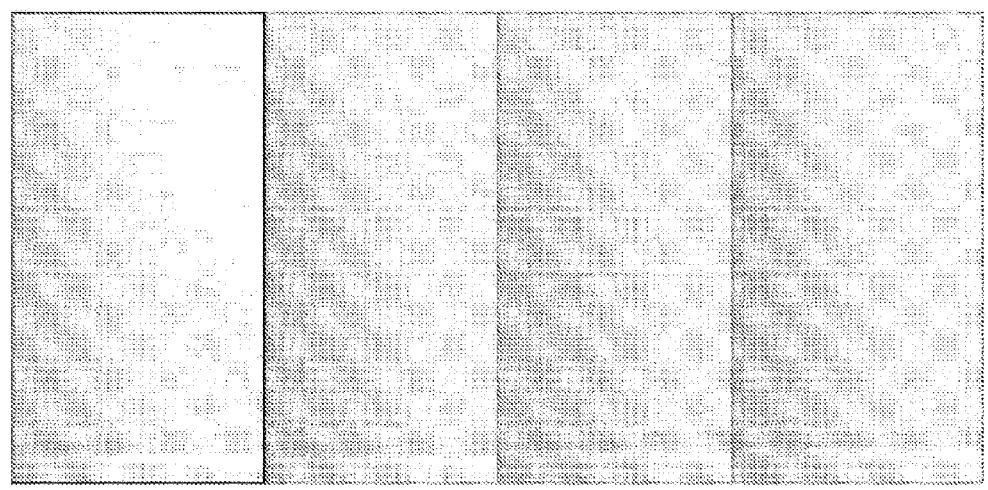
FIG. 6C

VIRTUAL VIEWPOINT SYNTHESIS METHOD AND SYSTEM

CROSS-REFERENCE TO RELATED APPLICATIONS

This application is a continuation-in-part of International Patent Application No. PCT/CN2013/080282 with an international filing date of Jul. 29, 2013, designating the United States, now pending. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The invention relates to a technical field of multi-view video encoding and decoding, in particular to a virtual viewpoint synthesis method and system.

Description of the Related Art

A multi-view video refers to a set of video signals obtained by recording the same scene from different angles by multiple cameras with different viewpoints, and is an effective 3D video representation method, which can make the scene be perceived more vividly. It has extremely wide application in 3D television, free viewpoint television, 3D video conference and video monitoring.

A multi-view video records the scene from different viewpoints by a set of synchronous cameras. The video can display images of corresponding angles according to a viewer's position while being displayed. When the viewer's head moves, what the viewer sees also changes correspondingly. Thus a "circular view" effect is created.

In order to obtain a natural and smooth motion parallax effect, extremely densely arranged cameras are needed to obtain a multi-view video sequence. However, as the number of cameras increases, the data volume of the multi-view video also doubles, which is a great challenge for data storage and transmission.

Under the condition of a low code rate, in order to obtain a high-quality 3D video stream, the multi-view video generally adopts a format of double viewpoints plus depth, compresses and encodes colorful video images and depth images respectively. The video decoding adopts the virtual viewpoint synthesis technology of depth image based rendering (DIBR), uses left and right viewpoints and corresponding depth images to generate a multi-view video, and rebuilds a one angle or multi-angle 3D video according to a user's requirements (3D Video or free viewpoint video). The virtual viewpoint synthesis technology is one of the key technologies in encoding and decoding multi-viewpoint videos. The quality of composite images has a direct influence on the watching quality of multi-viewpoint videos.

A virtual viewpoint synthesis method in the prior art only has one virtual image during the entire process, and searches for candidate pixels in left and right reference viewpoints at the same time for one pixel. Therefore, the candidate pixel set of the pixel may comprise pixels from two viewpoints and all candidate pixels are used in the following weighted summation without screening. The depth image-based method depends on the accuracy of depth images greatly. The discontinuity of depth images may also influence the quality of composite views. Therefore, the conventional solutions suffer from problems either in boundary regions or in background regions.

SUMMARY OF THE INVENTION

In view of the above described problems, the invention provides a virtual viewpoint synthesis method and system.

According to the first aspect of the invention, the invention provides a virtual viewpoint synthesis method comprising that:

it establishes a left viewpoint virtual view and a right viewpoint virtual view and obtains (u, v) to (u+1, v) pixel blocks for the pixel with a coordinate of (u, v) in a virtual viewpoint, that is, I(u)=[u, u+1];

the left viewpoint virtual view searches for a candidate pixel in a left viewpoint reference view, the right viewpoint virtual view searches for a candidate pixel in a right viewpoint reference view, and a pixel block in which a candidate pixel is not found in the left viewpoint reference view and/or the right viewpoint reference view is marked as a hole point;

it ranks the found candidate pixels according to depth, successively calculates a foreground coefficient and a background coefficient, and performs weighted summation according to the foreground coefficient and the background coefficient, and, if the difference between the depth value of the current pixel and the depth value of the initial pixel in weighted summation exceeds the first predetermined threshold value, the pixels are not included in the weighted summation;

it enlarges the hole-point regions of the left viewpoint virtual view and/or the right viewpoint virtual view in the direction of the background to remove a ghost pixel;

it performs viewpoint synthesis on the left viewpoint virtual view and the right viewpoint virtual view; and it fills the hole-points of a composite image.

In the method, the left viewpoint virtual view searches for a candidate pixel in the left viewpoint reference view; the right viewpoint virtual view searches for a candidate pixel in the right viewpoint reference view; and the pixel block in which a candidate pixel is not found in the left viewpoint reference view and/or the right viewpoint reference view is marked as a hole point; it also comprises that:

it searches for a candidate pixel in a reference view and sets a first adjustable parameter; when the first adjustable parameter is a preset initial value, 1 is added to the first adjustable parameter for a new search if a pixel block in which a candidate parameter isn't found; and, if the pixel block in which a candidate pixel is still not found, the pixel block is marked as a hole point.

In the method, the foreground coefficient is calculated by $w_j^f = |I_j(u_r, t) \cap I^f(u)|$, and the background coefficient is calculated by $w_j^b = |I(u) \cap I_j(u_r, t)| - w_j^f$; in which, $I_j(u_r, t) = [u_r-t, u_r+1+t]$ represents a pixel block in a reference viewpoint, t represents a second adjustable parameter, and $I^f(u)$ represents the specific gravity which isn't covered by previous pixels in a pixel block of a virtual viewpoint. The formula for performing weighted summation according to the foreground coefficient and the background coefficient is as below:

$$Y(u) = \frac{\sum_{j=1}^{|C(u)|} (w_j^f + \alpha_j \times w_j^b) Y(j)}{\sum_{j=1}^{|C(u)|} (w_j^f + \alpha_j \times w_j^b)},$$

in which, $\alpha_j$ controls pixel weights in a synthesis process according to depth values of pixels.

In the method, the hole-point regions of the left viewpoint virtual view and/or the right viewpoint virtual view are enlarged in the direction of the background to remove a ghost pixel, which specifically comprises that:

it scans the left viewpoint and/or right viewpoint virtual views line by line; when it scans a hole point, it records the initial position of the hole point and then continues to scan the views towards the right to find the right boundary of the hole-point region; then, it separately chooses a predetermined amount of pixels from the left and right boundaries outward in succession, and calculates the average depth values of pixels which are respectively recorded as d_left and d_right; it calculates the difference value between d_left and d_right; and then it compares the difference value between d_left and d_right to the second predetermined threshold value to determine the enlarging direction of hole-point regions:

if d_left-d_right is greater than the second predetermined threshold value, the hole-point region is enlarged towards the left;

if d_left-d_right is less than the second predetermined threshold value, the hole-point region is enlarged towards the right; and if d_left-d_right equals to the second predetermined threshold value, the hole-point region isn't enlarged.

In the method, the viewpoint synthesis which is performed on the left viewpoint virtual view and the right viewpoint virtual view comprises that:

when the left viewpoint virtual view and the right viewpoint virtual view both have pixel values, weighted summation is performed according to distances between the virtual points and the right and left viewpoints;

when only one virtual image has a pixel value in the left viewpoint virtual view and the right viewpoint virtual view and the corresponding point of another virtual image is a hole point, it takes the pixel value directly; and when the left viewpoint virtual view and the right viewpoint virtual view are both hole points, it retains the hole points.

According to the second aspect of the invention, the invention provides a virtual viewpoint synthesis system comprising a viewpoint mapping module, a ghost pixel removal module, a viewpoint synthesis module and a small hole-filling module. The viewpoint mapping module comprises an establishment unit, a selection unit and a control unit.

The establishment unit is used to establish a left viewpoint virtual view and a right viewpoint virtual view. In a virtual viewpoint, it obtains (u, v) to (u+1, v) pixel blocks for a pixel with a coordinate of (u, v), that is, I(u)=[u, u+1).

The selection unit is used to search for a candidate pixel of the left viewpoint virtual view in the left viewpoint reference view and a candidate pixel of the right viewpoint virtual view in the right viewpoint reference view, and a pixel block in which a candidate pixel is not found in the left viewpoint virtual view and/or the right viewpoint virtual view is marked as a hole point.

The control unit ranks the found candidate pixels according to depth, successively calculates a foreground coefficient and a background coefficient, and performs weighted summation according to the foreground coefficient and the background coefficient, and, if the difference between the depth value of the current pixel and the depth value of the initial pixel in weighted summation exceeds the first predetermined threshold value, the pixels are not included in the weighted summation.

The ghost pixel removal module is used to enlarge the hole-point regions of the left viewpoint virtual view and/or the right viewpoint virtual view in the direction of the background to remove a ghost pixel.

The viewpoint synthesis module is used to perform viewpoint synthesis on the left viewpoint virtual view and the right viewpoint virtual view.

The small hole-filling module is used to fill the hole-points of a composite image.

In the system, the selection unit is also used to search for a candidate pixel in a reference view and set a first adjustable parameter. When the first adjustable parameter is a preset initial value, 1 is added to the first adjustable parameter for a new search if the pixel block of the candidate parameter is not found; and the pixel block is marked as a hole point if the pixel block of candidate pixels is still not found.

In the system, the foreground coefficient is calculated by $w_j^f = |I_j(u_r, t) \cap I^V(u)|$, and the background coefficient is calculated by $w_j^b = \|(u) \cap I_j(u_r, t)| - w_j^f$; in which, $I_j(u_r, t) = [u_r-t, u_r+1+t)$ represents a pixel block in a reference viewpoint, t represents a second adjustable parameter, and $I^V(u)$ represents the specific gravity which isn't covered by previous pixels in a pixel block of a virtual viewpoint. The formula for performing weighted summation according to the foreground coefficient and the background coefficient is as below:

$$Y(u) = \frac{\sum_{j=1}^{|C(u)|} (w_j^f + \alpha_j \times w_j^b) Y(j)}{\sum_{j=1}^{|C(u)|} (w_j^f + \alpha_j \times w_j^b)}$$

in which, $\alpha_j$ controls weights in a synthesis process according to depth values of pixels.

In the system, the ghost pixel removal module is also used to scan the left viewpoint and/or right viewpoint virtual views line by line; when it scans a hole point, it records the initial position of the hole point and then continues to scan the views towards the right to find the right boundary of the hole-point region; then, it separately chooses a predetermined amount of pixels from the left and right boundaries outward in succession, and calculates the average depth values of pixels which are respectively recorded as d_left and d_right; it calculates the difference value between d_left and d_right; and then it compares the difference value between d_left and d_right to the second predetermined threshold value to determine the enlarging direction of hole-point regions:

if d_left-d_right is greater than the second predetermined threshold value, the hole-point region is enlarged towards the left;

if d_left-d_right is less than the second predetermined threshold value, the hole-point region is enlarged towards the right; and if d_left-d_right equals to the second predetermined threshold value, the hole-point region isn't enlarged.

In the system, the viewpoint synthesis module is also used to perform weighted summation according to distances between the virtual points and the right and left viewpoints when the left viewpoint virtual view and the right viewpoint virtual view both have pixel values;

when only one virtual image has a pixel value in the left viewpoint virtual view and the right viewpoint virtual view and the corresponding point of another virtual image is a hole point, it takes the pixel value directly; and when the left viewpoint virtual view and the right viewpoint virtual view are both hole points, it retains the hole points.

Since the above technical proposal is used, the invention has the following advantageous effect:

In embodiments of the invention, since pixel blocks represent pixels, the left viewpoint virtual view searches for a candidate pixel in a left viewpoint reference view, the right viewpoint virtual view searches for a candidate pixel in a right viewpoint reference view. It searches pixel blocks in the left viewpoint virtual view and the right viewpoint virtual view respectively, ranks the found candidate pixels according to depth, and successively calculates a foreground coefficient and a background coefficient for performing weighted summation. If the difference between the depth value of the current pixel and the depth value of the initial pixel in weighted summation exceeds the first predetermined threshold value, the pixels are not included in the weighted summation. A pixel block in which a candidate pixel is not found is marked as hole point, the hole-point region is just a portion where color mixing occurs easily, and information in a corresponding image is used for filling, the phenomena of a boundary being mixed with a background, which easily occurs in a boundary region, is avoided, and good synthesis quality is obtained at boundary and non-boundary regions at the same time.

BRIEF DESCRIPTION OF THE DRAWINGS

FIGS. 6A, 6B, and 6C are comparison diagrams of synthesis results;

DETAILED DESCRIPTION OF THE EMBODIMENTS

The following content further explains the invention in detail with embodiments and figures.

Example 1

As shown in the figures, an embodiment of a virtual viewpoint synthesis method of the invention comprises the following steps:

Step 102: it establishes a left viewpoint virtual view and a right viewpoint virtual view and obtains (u, v) to (u+1, v) pixel blocks for a pixel with a coordinate of (u, v) in a virtual viewpoint, that is, $I(u)=[u, u+1)$.

It draws a virtual view for left and right viewpoints respectively, takes a pixel as a block with an area instead of a dot. In a virtual viewpoint, a pixel block with a coordinate of (u, v) refers to the portion between (u, v) and (u+1, v), which is defined as $I(u)=[u, u+1)$. It searches for all pixels which are mapped to the virtual viewpoint and intersect with (u, v) in a reference viewpoint, that is, $I(u) \cap I(u_r+\delta) \neq \emptyset$.

Step 104: the left viewpoint virtual view searches for a candidate pixel in a left viewpoint reference view, the right viewpoint virtual view searches for a candidate pixel in a right viewpoint reference view, and a pixel block in which a candidate pixel is not found in the left viewpoint reference view and/or the right viewpoint reference view is marked as a hole point.

Figure 1:
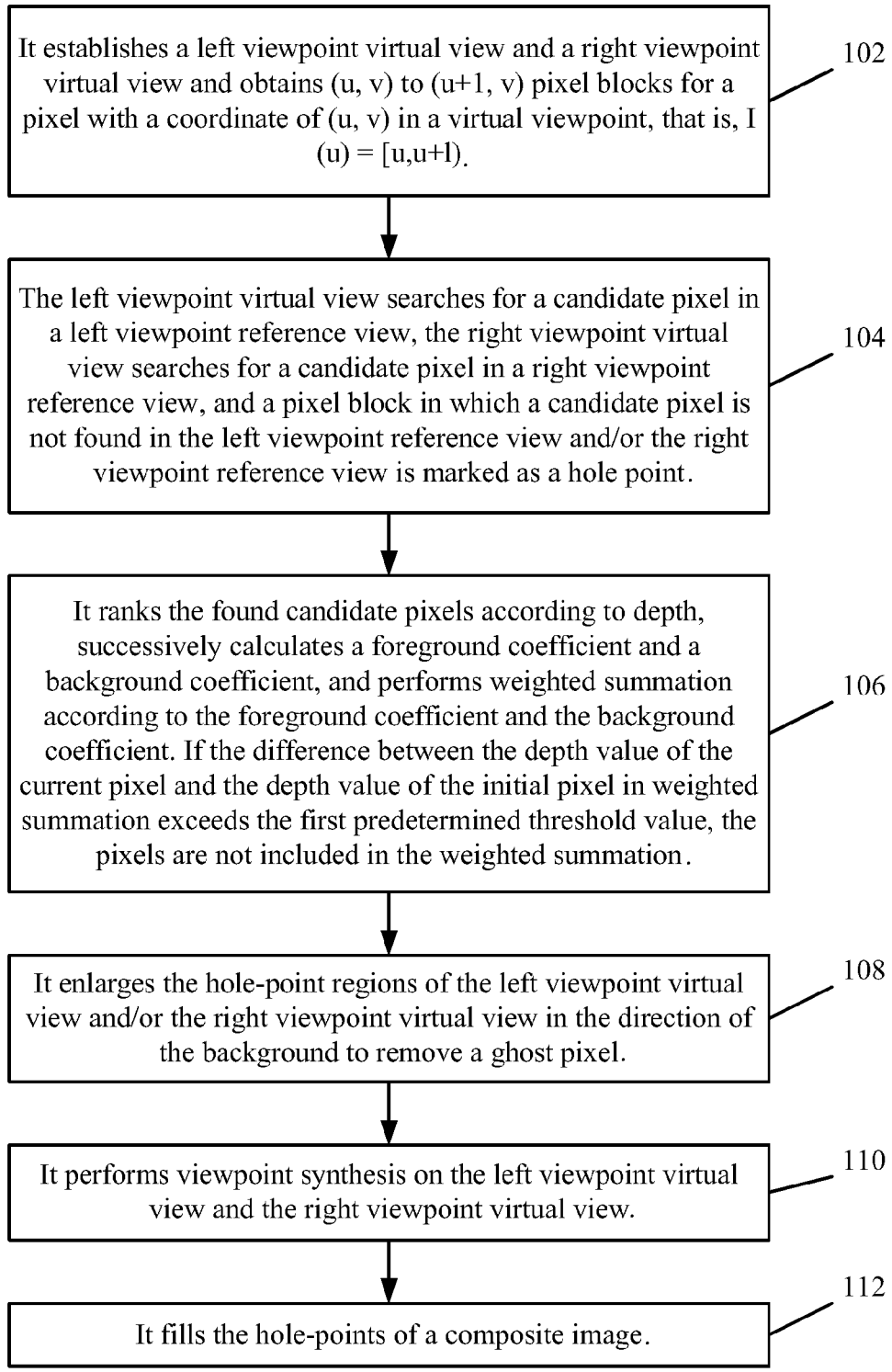
FIG. 1 is a flow diagram of a virtual viewpoint synthesis method in accordance with an embodiment of the invention.
Figure 2A:
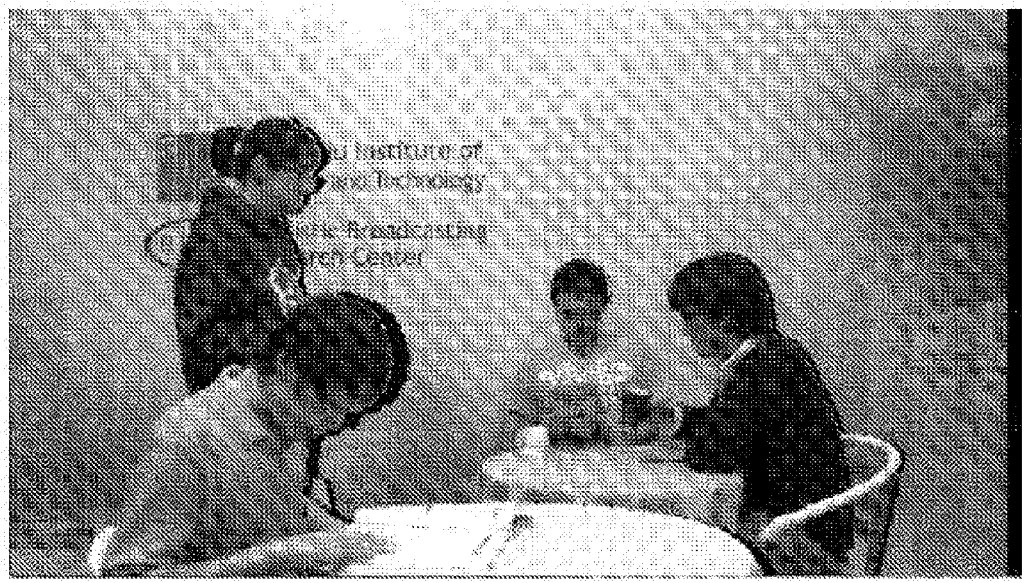
FIGS. 2A and 2B are diagrams of a single viewpoint mapping intermediate structure of the invention.
Figure 2B:
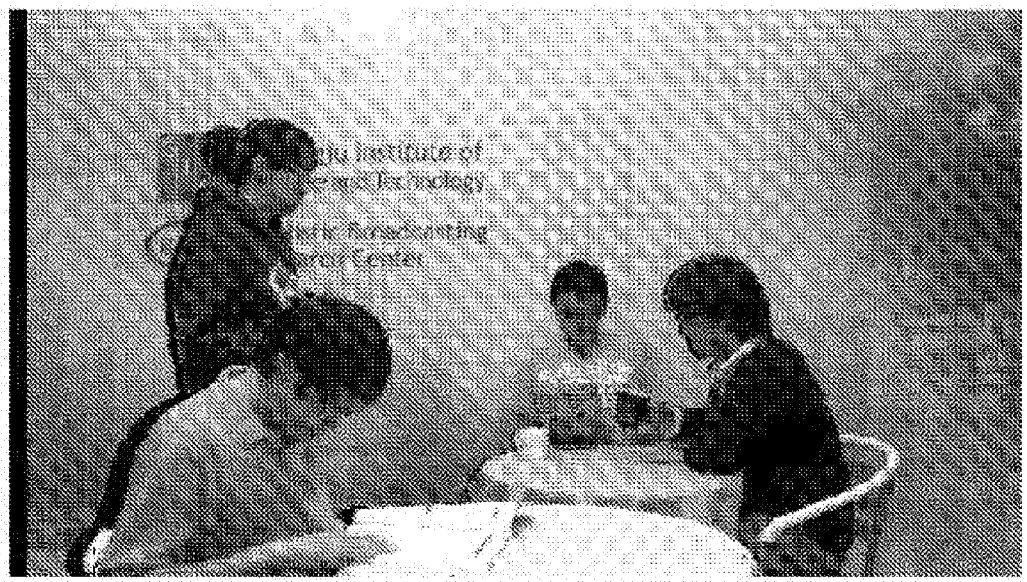

A virtual view from a left viewpoint only searches for a candidate pixel in a left view. If the candidate pixel is not found, the pixel is marked as a hole point. A virtual view from a right viewpoint only searches for a candidate pixel in a right view. If the candidate pixel is not found, the pixel is marked as a hole point. Therefore, a preliminary virtual view with the boundary region as the hole-point region can be obtained as shown in FIGS. 2A and 2B. The hole-point region is just a portion where color mixing occurs easily in the original method. The hole-point region can be filled by information in a corresponding image. The hole-point region shown in FIG. 2A can be filled by FIG. 2B. Thus, defects in the boundary region in the original method are avoided.

It searches for a candidate pixel in a reference view and sets a first adjustable parameter; when the first adjustable parameter is a preset initial value, 1 is added to the first adjustable parameter for a new search if a pixel block in which a candidate parameter isn't found; and, if the pixel block in which a candidate pixel is still not found, the pixel block is marked as a hole point.

Figure 3:
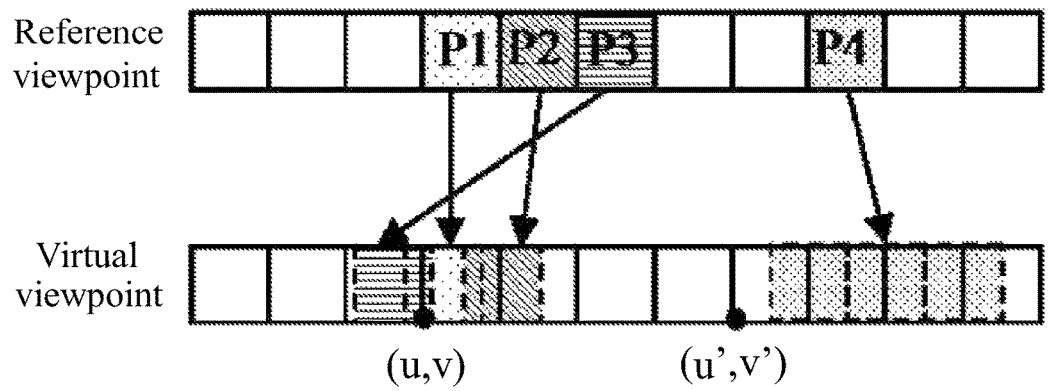
FIG. 3 is a diagram of a pixel block-based mapping mode of the invention.

As shown in FIG. 3, the candidate pixel set searched for (u, v) is {P1, P2, P3}. In addition, an adjustable parameter t is set. The definition of a pixel block in a reference viewpoint is represented as $I(u_r, t)=[u_r-t, u_r+1+t)$. The initial value of t is 0. When (u, v) in which a candidate pixel is not found, 1 is added to t for a new search. As for the (u', v') pixel shown in FIGS. 2A and 2B, when t=0, the candidate pixel set is a null set; when t=1, the candidate pixel searched for it is {P4}; if the candidate pixel set is still not found, the search ends and it is marked as a hole-point region.

The hole-point region is just a portion where color mixing occurs easily. The hole-point region can be filled by information in a corresponding image. The hole-point region shown in FIG. 2A can be filled by FIG. 2B. Thus, defects in the boundary region in the original method are avoided. In addition, during weighted summation, if the difference between the depth value of the current pixel and the depth value of the initial pixel (the first pixel in weighted summation), which are represented as a foreground and a background respectively, exceeds a certain threshold value, the pixels are not included in the weighted summation. Otherwise, a color mixing problem may also occur too.

Mapping is performed on left and right viewpoints to obtain two virtual viewpoint images with hole points.

Step 106: it ranks the found candidate pixels according to depth, successively calculates a foreground coefficient and a background coefficient, and performs weighted summation according to the foreground coefficient and the background coefficient. If the difference between the depth value of the current pixel and the depth value of the initial pixel in weighted summation exceeds the first predetermined threshold value, the pixels are not included in the weighted summation.

If the candidate pixel set C (u) is not a null set, the candidate pixels are ranked according to depth values from a small to a large, namely, according to their distances to a camera from a near to a far. The foreground coefficient $w_j^f$ and background coefficient $w_j^b$ of every pixel are calculated. The computing method is as follows:

$$\text{Foreground Coefficient: } w_j^f = |I_j(u_r, t) \cap I^j(u)| \quad (1),$$

in which, $I^j(u)$ represents the specific gravity which isn't covered by a previous pixel in a target pixel block. The computing method is as follows:

$$I^j(u) = \begin{cases} I(u) & \text{if } j = 0 \\ I^{j-1}(u) \setminus \{I^{j-1}(u) \cap I_{j-1}(u_r, t)\} & \text{if } j > 0 \end{cases} \quad (2)$$

Then, the background coefficient is $$w_j^b = |I(u) \cap I_j(u_r, t)| - w_j^f \quad (3).$$

Then, the following formula is used to perform weighted summation on all candidate pixels:

$$Y(u) = \frac{\sum_{j=1}^{|C(u)|} (w_j^f + \alpha_j \times w_j^b) Y(j)}{\sum_{j=1}^{|C(u)|} (w_j^f + \alpha_j \times w_j^b)}, \quad (4)$$

in which, $\alpha_j$ controls weights in a synthesis process according to depth values of pixels to improve accuracy. The computing formula is:

$$\alpha_j = 1 - (z_j - z_1)/z_1 \quad (5).$$

Figure 4:
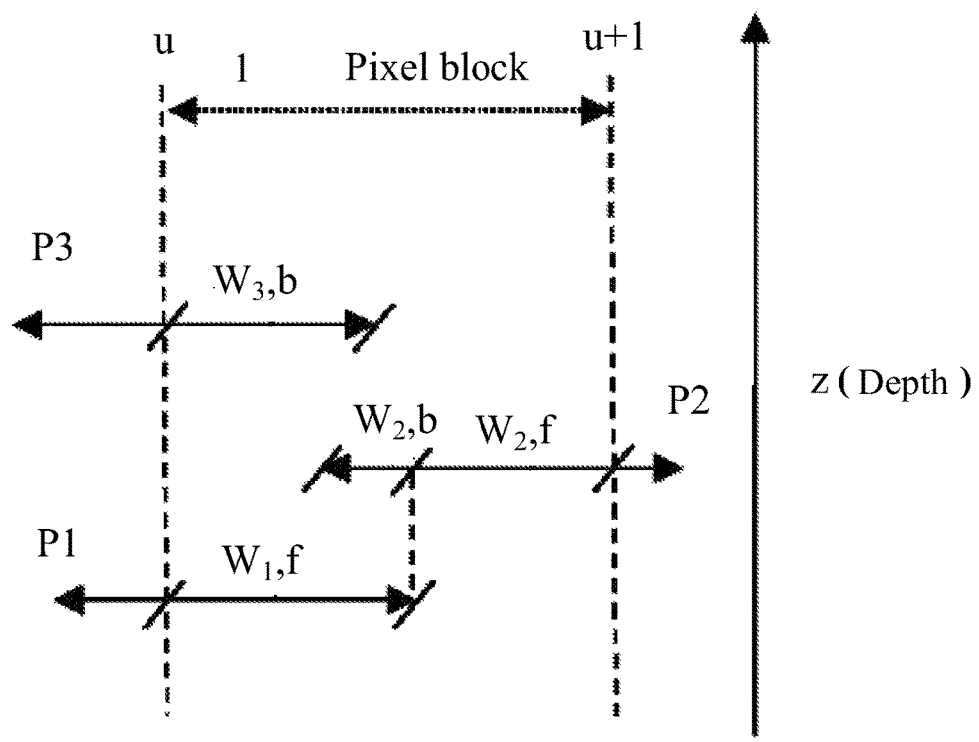
FIG. 4 is a diagram of a pixel value computing method of the invention.

FIG. 4 shows a weighted summation process of a candidate pixel set {P1, P2, P3} of the block (u, v) shown in FIG. 3. P1, P2 and P3 are ranked according to depth and the computation sequence is P1→P2→P3. Firstly, the foreground coefficient $w_{1,f}$ of P1 is calculated and obtained from the overlapping portion of P1 and the block (u, v). Then, P2 is calculated and the overlapping portion of P2 and the uncovered portion of the block (u, v) is $w_{2,f}$ as shown in the figure, namely the foreground coefficient of P2. Then, the overlapping portion of P2 and (u, v) minus the foreground portion is the background coefficient $w_{2,b}$ of P2. Finally, since the foreground coefficients of P1 and P2 have covered the block (u, v) completely, the foreground coefficient of P3 is 0. The overlapping portion of P3 and the block (u, v) is all the background coefficient $w_{3,b}$ of P3. After foreground and background coefficients of all candidate pixels are figured out, the Formula (4) is used to perform weighted summation.

During weighted summation, if the difference between the depth value of the current pixel and the depth value of the initial pixel (the first pixel in weighted summation) exceeds a certain threshold value, the pixels are not included in the weighted summation. Mapping is performed on left and right viewpoints to obtain two virtual viewpoint images with hole points. A threshold value can be calculated by (minDepth+p*(maxDepth−minDepth)), in which, p is an empirical value which is a constant of 0.3<p<0.5. In the embodiment, p is 0.33.

Step 108: it enlarges the hole-point regions of the left viewpoint virtual view and/or the right viewpoint virtual view in the direction of the background to remove a ghost pixel.

Figures 5A, 5B:
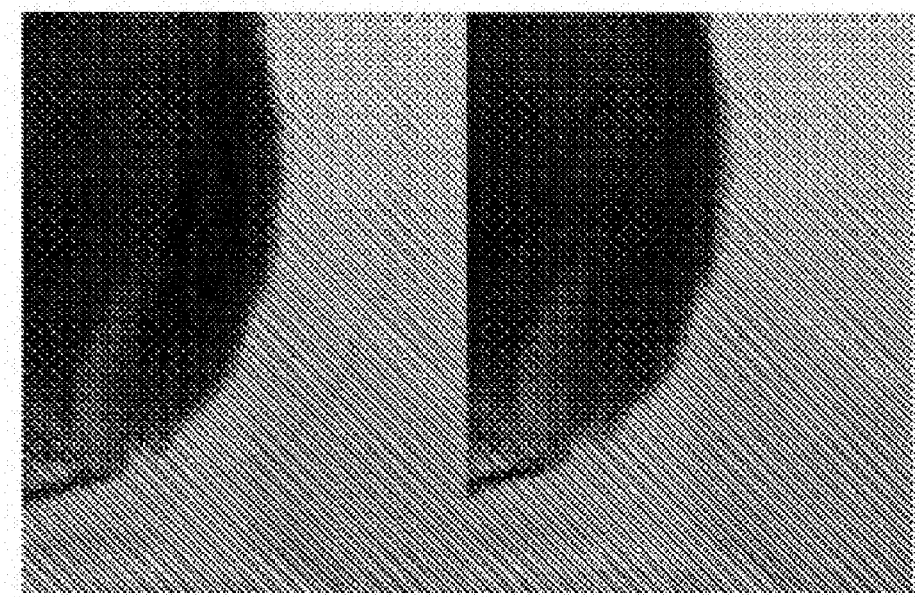
FIGS. 5A, 5B, 5C, and 5D are diagrams of ghost pixel removal of the invention.
Figures 5C, 5D:
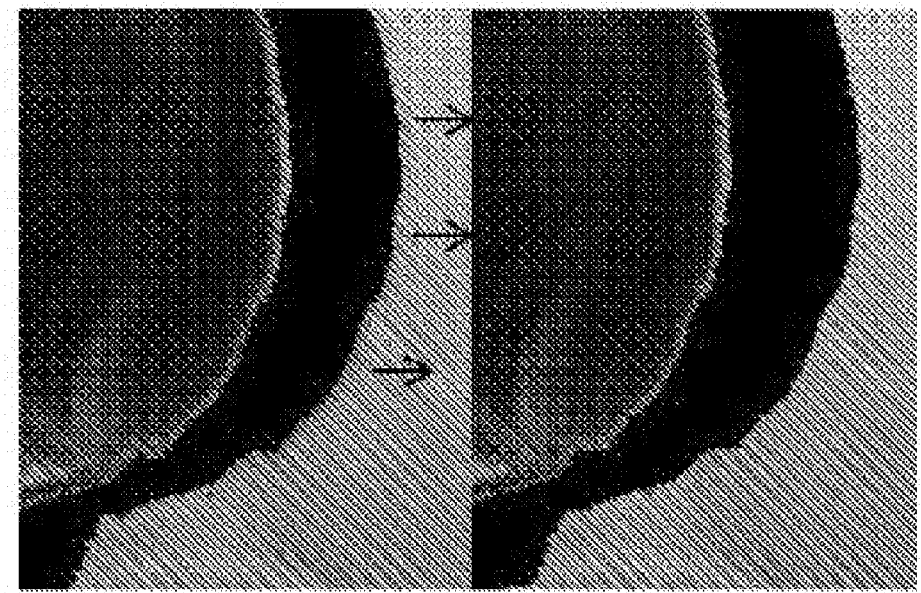

A ghost phenomenon comes from the discontinuity of depth images which makes the foreground boundary map to the background region and generates a ghost phenomenon. As shown in FIGS. 5A and 5C, ghost pixels gather in the place where hole-point regions and backgrounds meet. Therefore, this step enlarges the hole-point region in the virtual viewpoint image with a hole point produced by the single viewpoint mapping module in the direction of the background to remove a ghost pixel and form a hole point. As shown in FIGS. 5C and 5D, the corresponding pixel of another viewpoint is used for filling in the following step.

In this step, it can scan virtual viewpoint line by line; when it scans a hole point, it records the initial position of the hole point and then continues to scan the views towards the right to find the right boundary of the hole-point region; then, it separately chooses multiple pixels from the left and right boundaries outward in succession, and the number of chosen pixels can be set according to requirements. Generally, 3 to 8 pixels are chosen. In the embodiment, 5 pixels can be chosen, and the average depth values of pixels on the left side and the right side are calculated and recorded as d_left and d_right respectively. The difference value between d_left and d_right is calculated. The difference value between d_left and d_right is compared to the second predetermined threshold value to determine the enlarging direction of hole-point regions. The specific step is as follows:

It scans the left viewpoint and/or right viewpoint virtual views line by line; when it scans a hole point, it records the initial position of the hole point and then continues to scan the views towards the right to find the right boundary of the hole-point region; then, it separately chooses a predetermined amount of pixels from the left and right boundaries outward in succession, and calculates the average depth values of pixels which are respectively recorded as d_left and d_right; it calculates the difference value between d_left and d_right; and then it compares the difference value between d_left and d_right to the second predetermined threshold value to determine the enlarging direction of hole-point regions. The specific step is as follows:
- if d_left−d_right is greater than the second predetermined threshold value, the hole-point region is enlarged towards the left;
- if d_left−d_right is less than the second predetermined threshold value, the hole-point region is enlarged towards the right; and
- if d_left−d_right equals to the second predetermined threshold value, the hole-point region isn't enlarged.

The second predetermined threshold value is an empirical value which could range between 15 and 25. The second predetermined threshold value is 20 in the embodiment.

Step 110: it performs viewpoint synthesis on the left viewpoint virtual view and the right viewpoint virtual view. The left and right viewpoints generate a virtual viewpoint image separately. The two virtual viewpoint images constitute an image. The method is to perform weighted summation according to distances between the virtual points and the right and left viewpoints. More specifically, there are three situations as follows:
when the left viewpoint virtual view and the right viewpoint virtual view both have pixel values, weighted summation is performed according to distances between the virtual points and the right and left viewpoints;

when only one virtual image has a pixel value in the left viewpoint virtual view and the right viewpoint virtual view and the corresponding point of another virtual image is a hole point, it takes the pixel value directly; and when the left viewpoint virtual view and the right viewpoint virtual view are both hole points, it retains the hole points.

Step 112: it fills the hole-points of a composite image.

After the above steps are completed, some small hole points may still exist. This step is to fill all the hole points. Experimental results show that, generally, there are few hole points exist after the above steps are completed. Therefore, a simple background filling method is enough. A background estimation method is like a method to estimate whether the background is on the left side of the hole-point region or on the right side of the hole-point region. The difference is that it needs no threshold value and directly compares the value d_left to the value of d_right. When d_left>d_right, the left side of the hole point is a background and the value of a pixel closest to the left side is used to fill the hole point; and, when d_left<d_right, the value of a pixel closet to the right side is used to fill the hole point.

Through the step, a final virtual viewpoint image is obtained.

FIGS. 6A, 6B, and 6C show experimental results of the VSRS viewpoint synthesis reference software of a virtual viewpoint synthesis method (Pixel-block Based View Synthesis, PBVS) provided by the invention and the viewpoint synthesis method IBIS put forward by Paradiso V, etc. (Paradiso V, Lucenteforte M, Grangetto M. A novel interpolation method for 3D view synthesis [C]//3DTV-Conference: The True Vision-Capture, Transmission and Display of 3D Video (3DTV-C0N), 2012. IEEE, 2012: 1-4.) in a newspaper sequence. The figure shows the synthesis result of a first frame. FIG. 6A shows an original view. FIG. 6B is an enlarged drawing of the block I framed in red in FIG. 6A. From left to right are the original view, the VSRS synthesis result, the IBIS synthesis result and the PBVS synthesis result. FIG. 6C is an enlarged drawing of the block II framed in red in FIG. 6A, whose sequence is the same with that of FIG. 6B. FIG. 6B shows that a phenomenon of color mixing existing in foreground boundary regions (for example, leaves of a potted plant) by IBIS algorithm. However, the PBVS method provided by the invention has a good effect. The reason is that hole points are retained in boundary regions in single viewpoint mapping and high-quality corresponding pixels of a corresponding viewpoint are used to fill the hole points. FIG. 6C shows the PBVS method significantly improves the synthesis effect of wall parts. The synthesis results of the VSRS and IBIS methods show an unsmooth texture with many cracks. However, the synthesis result of the PBVS method shows a considerable smooth texture, which approaches the effect of an original image more. A single-way viewpoint mapping module contributes to the good result, which performs weighted summation on contributory reference pixels in a scientific way.

Figure 7A:
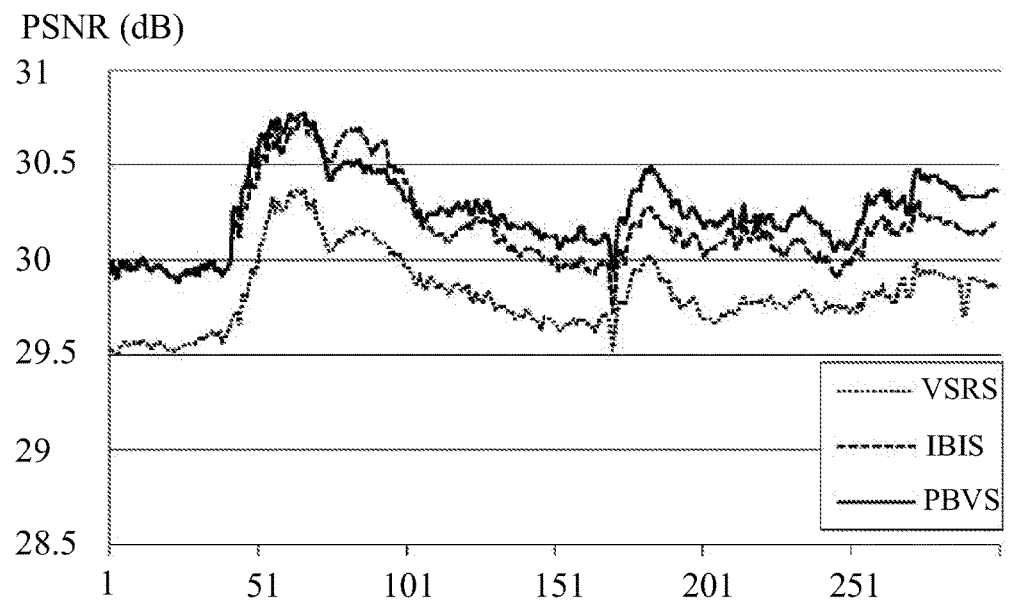
FIGS. 7A, 7B, 7C, and 7D are curve diagrams of PSNR.
Figure 7B:
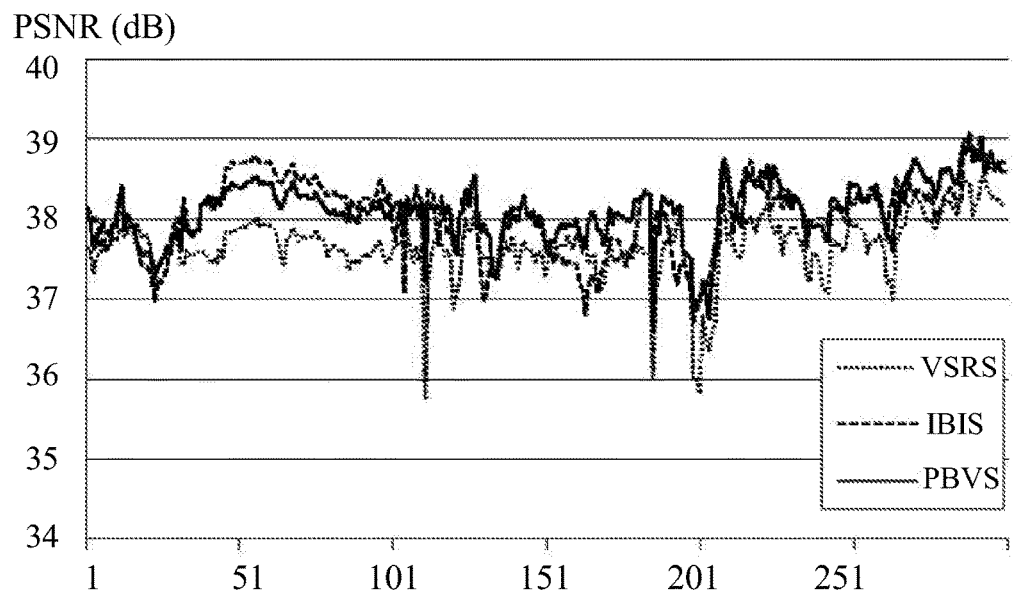
Figure 7C:
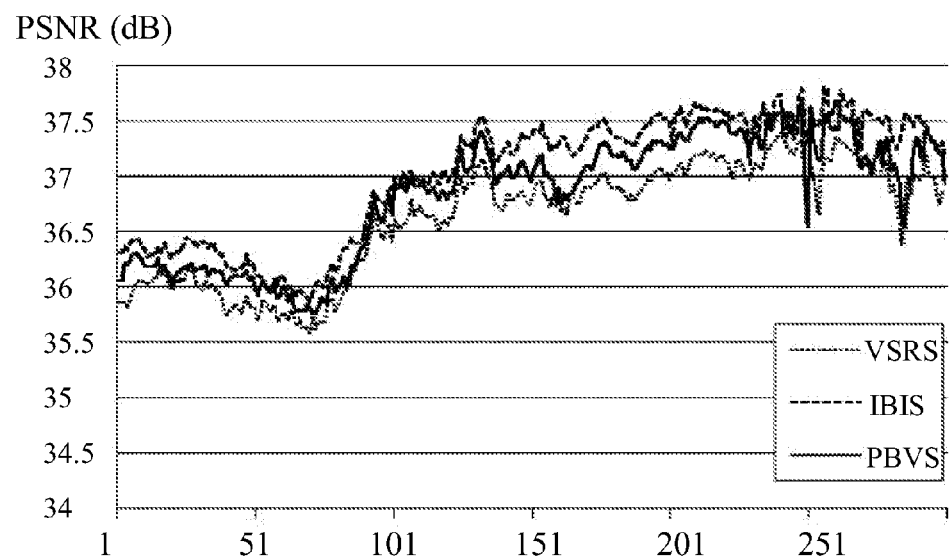
Figure 7D:
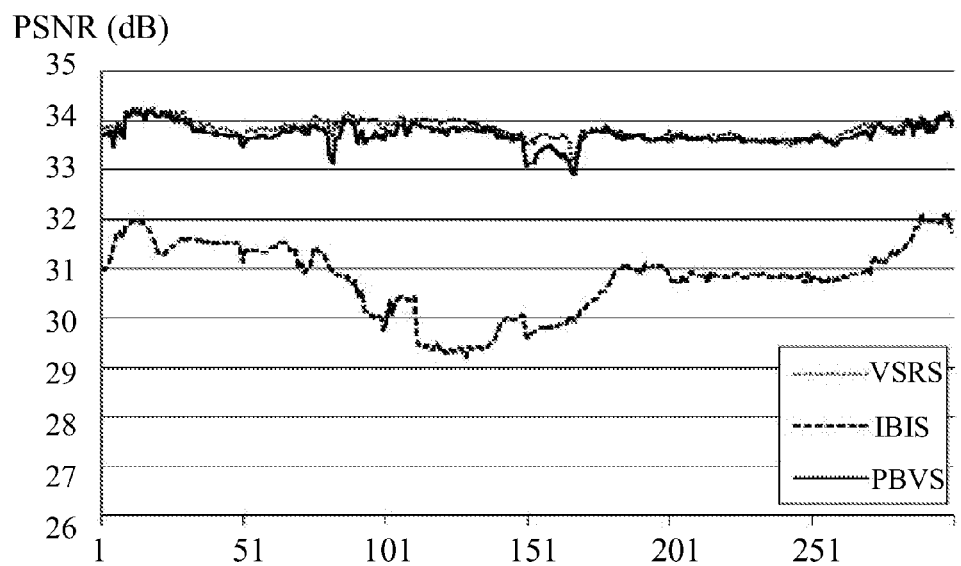

FIGS. 7A, 7B, 7C, and 7D are curve diagrams of PSNR which shows synthesis results of three methods in newspaper, kendo, balloons and café sequences. FIG. 7A is a curve diagram of PSNR shows synthesis result in the newspaper sequence. FIG. 7B is a curve diagram of PSNR shows synthesis result in the kendo sequence. FIG. 7C is a curve diagram of PSNR shows synthesis result in the balloons sequence. FIG. 7D is a curve diagram of PSNR shows synthesis result in the café sequence. Table 1 shows description information of the four sequences.

TABLE 1

| Test Sequence | Resolution Ratio | Frame Number | Reference Viewpoint | Synthesis Viewpoint |
|---|---|---|---|---|
| Newspaper | 1024 * 768 | 300 | 2,4 | 3 |
| Kendo | 1024 * 768 | 300 | 3,5 | 4 |
| Balloons | 1024 * 768 | 300 | 3,5 | 4 |
| Cafe | 1920 * 1080 | 300 | 2,4 | 3 |

Figure 8:
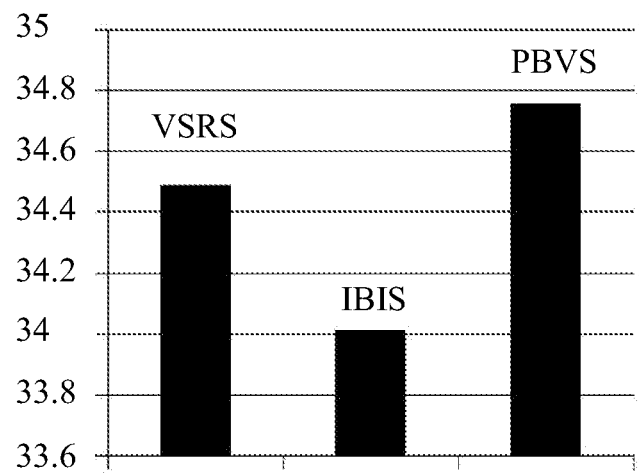
FIG. 8 is a histogram of average PSNR.

FIG. 8 shows that the PBVS method is better than the VSRS method in newspaper, kendo and balloons sequences, similar in the café sequence in terms of synthesis result. However, synthesis results of the IBIS method fluctuate greatly. Table 2 shows average PSNR values of three methods in each sequence.

TABLE 2

| Sequence/Algorithm | VSRS | IBIS | PBVS |
|---|---|---|---|
| Newspaper | 29.828708 | 30.175583 | 30.263581 |
| Kendo | 37.666434 | 38.062545 | 38.110075 |
| Balloons | 36.627105 | 37.023326 | 36.839745 |
| Cafe | 33.834154 | 30.806064 | 33.718762 |
| Average | 34.489100 | 34.013880 | 34.733041 |

Figure 9:
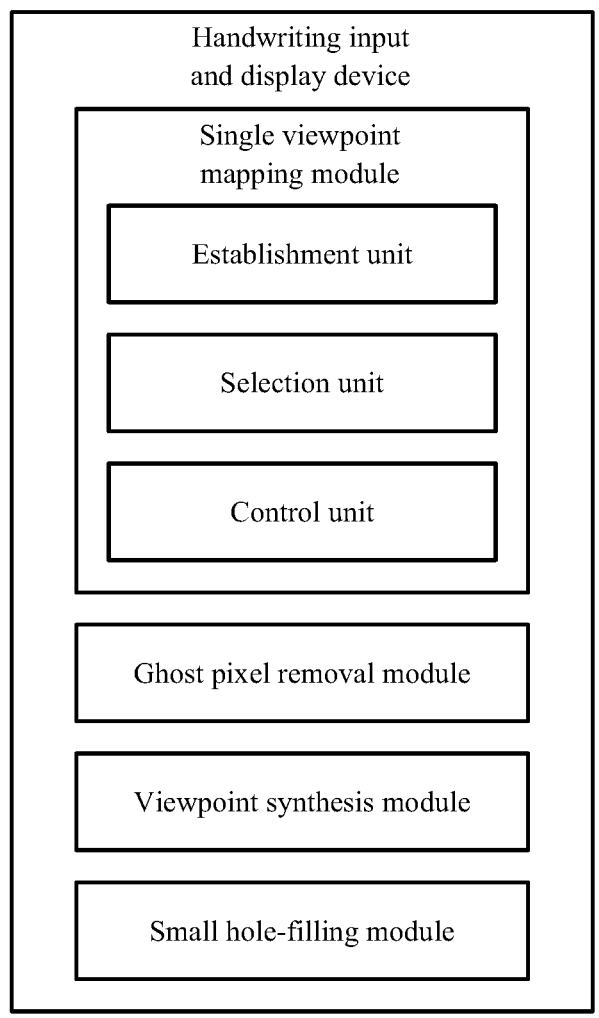
FIG. 9 is a structural diagram of a virtual viewpoint synthesis system in accordance with an embodiment of the invention.

FIG. 9 shows a histogram of Average PSNR of three methods.

The synthesis quality of the VSRS method is relatively stable in different sequences. Compared to that of the VSRS method, the synthesis quality of the IBIS method is better in some sequences like kendo and balloons but lowers obviously in some sequences like café, particularly in boundary regions with greater color differences. Compared to the two methods, the PBVS method can realize a considerably ideal synthesis effect in all sequences, which improve synthesis quality of virtual viewpoints while guaranteeing stability. FIG. 8 shows that, compared to the VSRS and IBIS methods, the PBVS method is obviously improved in term of average PSNR.

Example 2

As shown in FIG. 9, in an embodiment, a virtual viewpoint synthesis system of the invention comprises a viewpoint mapping module, a ghost pixel removal module, a viewpoint synthesis module and a small hole-filling module. The viewpoint mapping module comprises an establishment unit, a selection unit and a control unit.

The establishment unit is used to establish a left viewpoint virtual view and a right viewpoint virtual view. In a virtual viewpoint, it obtains (u, v) to (u+1, v) pixel blocks for a pixel with a coordinate of (u, v), that is, I(u)=[u, u+1].

The selection unit is used to search for a candidate pixel of the left viewpoint virtual view in the left viewpoint reference view and a candidate pixel of the right viewpoint virtual view in the right viewpoint reference view, and a pixel block in which a candidate pixel is not found in the left viewpoint virtual view and/or the right viewpoint virtual view is marked as a hole point.

The control unit ranks the found candidate pixels according to depth, successively calculates a foreground coefficient and a background coefficient and performs weighted summation according to the foreground coefficient and the background coefficient. If the difference between the depth value of the current pixel and the depth value of the initial pixel in weighted summation exceeds the first predetermined threshold value, the pixels are not included in the weighted summation.

The ghost pixel removal module is used to enlarge the hole-point regions of the left viewpoint virtual view and/or the right viewpoint virtual view in the direction of the background to remove a ghost pixel.

The viewpoint synthesis module is used to perform viewpoint synthesis on the left viewpoint virtual view and the right viewpoint virtual view.

The small hole-filling module is used to fill the hole-points of a composite image.

In an embodiment, the selection unit is also used to search for a candidate pixel in a reference view and set a first adjustable parameter. When the first adjustable parameter is a preset initial value, 1 is added to the first adjustable parameter for a new search if the pixel block of the candidate parameter is not found; and the pixel block is marked as a hole point if the pixel block of candidate pixels is still not found.

The foreground coefficient is calculated by $w_j^f = |I_j(u_r, t) \cap V(u)|$, and the background coefficient is calculated by $w_j^b = |I(u) \cap I_j(u_r, t)| - w_j^f$; in which, $I_j(u_r, t) = [u_r - t, u_r + 1 + t]$ represents a pixel block in a reference viewpoint, t represents a second adjustable parameter, and $V(u)$ represents the specific gravity which isn't covered by previous pixels in a pixel block of a virtual viewpoint:

$$Y(u) = \frac{\sum_{j=1}^{|C(u)|} (w_j^f + \alpha_j \times w_j^b) Y(j)}{\sum_{j=1}^{|C(u)|} (w_j^f + \alpha_j \times w_j^b)},$$

in which, $\alpha_j$ controls weights in a synthesis process according to depth values of pixels.

In an embodiment, the ghost pixel removal module is also used to scan the left viewpoint and/or right viewpoint virtual views line by line; when it scans a hole point, it records the initial position of the hole point and then continues to scan the views towards the right to find the right boundary of the hole-point region; then, it separately chooses a predetermined amount of pixels from the left and right boundaries outward in succession, and calculates the average depth values of pixels which are respectively recorded as d_left and d_right; it calculates the difference value between d_left and d_right; and then it compares the difference value between d_left and d_right to the second predetermined threshold value to determine the enlarging direction of hole-point regions:

if d_left-d_right is greater than the second predetermined threshold value, the hole-point region is enlarged towards the left;

if d_left-d_right is less than the second predetermined threshold value, the hole-point region is enlarged towards the right; and if d_left-d_right equals to the second predetermined threshold value, the hole-point region isn't enlarged.

In an embodiment, the viewpoint synthesis module is also used to perform weighted summation according to distances between the virtual points and the right and left viewpoints when the left viewpoint virtual view and the right viewpoint virtual view both have pixel values;

when only one virtual image has a pixel value in the left viewpoint virtual view and the right viewpoint virtual view and the corresponding point of another virtual image is a hole point, it takes the pixel value directly; and when the left viewpoint virtual view and the right viewpoint virtual view are both hole points, it retains the hole points.

The above content further explains the invention in detail with embodiments. The embodiments of the invention are not limited to these explanations. On the premise of adhering to the inventive concept of the invention, those skilled in the art can also make a plurality of simple deductions and replacements.

The invention claimed is:

1. A virtual viewpoint synthesis method, comprising:
establishing a left viewpoint virtual view and a right viewpoint virtual view and obtaining (u, v) to (u+1, v) pixel blocks for a pixel with a coordinate of (u, v) in a virtual viewpoint, that is, I(u)=[u, u+1);
searching for a candidate pixel in a left viewpoint reference view using the left viewpoint virtual view, searching for a candidate pixel in a right viewpoint reference view using the right viewpoint virtual view, marking a pixel block in which a candidate pixel isn't found in the left viewpoint reference view and/or the right viewpoint reference view as a hole point;
ranking the found candidate pixels according to depth, successively calculating a foreground coefficient and a background coefficient, and performing a weighted summation according to the foreground coefficient and the background coefficient, and, not including the pixels in the weighted summation if difference between depth value of current pixel and depth value of an initial pixel in the weighted summation exceeds a first predetermined threshold value;
enlarging hole-point regions of the left viewpoint virtual view and/or the right viewpoint virtual view in the direction of background to remove a ghost pixel;
performing viewpoint synthesis on the left viewpoint virtual view and the right viewpoint virtual view; and
filling the hole-points of a composite image.

2. The method of claim 1, comprising:
searching for a candidate pixel in a reference view and setting a first adjustable parameter; adding 1 to the first adjustable parameter for a new search if the pixel block in which a candidate pixel isn't found when the first adjustable parameter is a preset initial value; and marking the pixel block as a hole point if the pixel block in which a candidate pixel is still not found.

3. The method of claim 1, wherein:
the foreground coefficient is calculated by $w_j^f = |I_j(u_r, t) \cap V(u)|$;
the background coefficient is calculated by $w_j^b = |I(u) \cap I_j(u_r, t)| - w_j^f$;
wherein, $I_j(u_r, t) = [u_r - t, u_r + 1 + t]$ represents a pixel block in a reference viewpoint, t represents a second adjustable parameter, and $V(u)$ represents a specific gravity which isn't covered by previous pixels in a pixel block of a virtual viewpoint;
a formula for performing the weighted summation according to the foreground coefficient and the background coefficient is as below:

$$Y(u) = \frac{\sum_{j=1}^{|C(u)|}(w_j^f + \alpha_j \times w_j^b)Y(j)}{\sum_{j=1}^{|C(u)|}(w_j^f + \alpha_j \times w_j^b)},$$

wherein, $\alpha_j$ controls pixel weights in a synthesis process according to depth values of pixels.

4. The method of claim 1, wherein: the step of enlarging the hole-point regions of the left viewpoint virtual view and/or the right viewpoint virtual view in the direction of the background to remove a ghost pixel, comprising:

scanning the left viewpoint and/or right viewpoint virtual views line by line, recording an initial position of the hole point when scanning a hole point and then continuing to scan the views towards the right to find right boundary of the hole-point region; then, choosing a predetermined amount of pixels from the left and right boundaries outward in succession separately, and calculating average depth values of pixels which are respectively recorded as d_left and d_right; calculating a difference value between d_left and d_right; and then comparing the difference value between d_left and d_right to a second predetermined threshold value to determine enlarging direction of hole-point regions, wherein:

if d_left−d_right is greater than the second predetermined threshold value, the hole-point region is enlarged towards the left;

if d_left−d_right is less than the second predetermined threshold value, the hole-point region is enlarged towards the right; and if d_left−d_right equals to the second predetermined threshold value, the hole-point region isn't enlarged.

5. The method of claim 1, wherein: the step of performing the viewpoint synthesis on the left viewpoint virtual view and the right viewpoint virtual view, comprising:

performing a weighted summation according to distances between the virtual points and the right and left viewpoints when the left viewpoint virtual view and the right viewpoint virtual view both have pixel values;

taking the pixel value directly when only one virtual image has a pixel value in the left viewpoint virtual view and the right viewpoint virtual view and the corresponding point of another virtual image is a hole point; and retaining the hole points when the left viewpoint virtual view and the right viewpoint virtual view are both hole points.

* * * * *